US010916882B2

(12) United States Patent
Barker et al.

(10) Patent No.: US 10,916,882 B2
(45) Date of Patent: Feb. 9, 2021

(54) CABLE TETHER SYSTEM

(71) Applicant: Masimo Corporation, Irvine, CA (US)

(72) Inventors: Nicholas Evan Barker, Laguna Beach, CA (US); Susan Denton, Laguna Beach, CA (US); Eric Yang, Baldwin Park, CA (US); Sujin Hwang, Rancho Santa Margarita, CA (US)

(73) Assignee: MASIMO CORPORATION, Irvine, CA (US)

( * ) Notice: Subject to any disclaimer, the term of this patent is extended or adjusted under 35 U.S.C. 154(b) by 314 days.

(21) Appl. No.: 15/018,745

(22) Filed: Feb. 8, 2016

(65) Prior Publication Data

US 2016/0197436 A1 Jul. 7, 2016

Related U.S. Application Data

(63) Continuation of application No. 13/762,062, filed on Feb. 7, 2013, now Pat. No. 9,267,572.

(60) Provisional application No. 61/596,555, filed on Feb. 8, 2012.

(51) Int. Cl.
*F16G 11/02* (2006.01)
*H01R 13/60* (2006.01)
*F16G 11/00* (2006.01)
*H01R 13/639* (2006.01)
*G09F 3/02* (2006.01)

(52) U.S. Cl.
CPC ............. *H01R 13/60* (2013.01); *F16G 11/00* (2013.01); *G09F 3/02* (2013.01); *H01R 13/6392* (2013.01); *Y10T 24/398* (2015.01)

(58) Field of Classification Search
CPC .. H01R 24/20; H01R 13/6392; H01R 13/639; H01R 13/5804; H01R 13/5812; H01R 13/60; H01R 13/6393; F16B 45/02; E05B 67/06; E05B 73/0005; Y10T 24/44077; Y10T 24/44085; Y10T 24/398; Y10T 24/31; F16G 11/00; G09F 3/02; B60P 7/0823
USPC ........ 24/122.3; 439/292, 293, 299, 369, 370
See application file for complete search history.

(56) References Cited

U.S. PATENT DOCUMENTS

| 2,725,543 | A | | 11/1955 | Tanner | |
|---|---|---|---|---|---|
| 5,752,848 | A | * | 5/1998 | Youngmark | ....... H01R 13/6392 24/129 R |
| 6,033,251 | A | * | 3/2000 | Cook | ................. H01R 13/5812 439/369 |
| 6,997,734 | B1 | | 2/2006 | McQuirter | |
| D570,676 | S | | 6/2008 | Hager | |
| 9,114,749 | B2 | * | 8/2015 | Ashliman | ............. B60P 7/0823 |
| 9,267,572 | B2 | | 2/2016 | Barker et al. | |
| 2004/0008839 | A1 | | 1/2004 | Jozitis et al. | |
| 2004/0078929 | A1 | * | 4/2004 | Schoemann | .............. E05D 1/02 16/225 |

\* cited by examiner

*Primary Examiner* — Jack W Lavinder
(74) *Attorney, Agent, or Firm* — Knobbe, Martens, Olson & Bear, LLP (57) ABSTRACT

A cable tether system includes a base member and at least one elongate member extending away from the base member. The elongate member is configured to surround at least a portion of a first cable. A second elongate member can be configured to surround at least a portion of a second cable. The base member can include one or more engagement portions that couple with one or more engagement portions on the first and second elongate members.

35 Claims, 13 Drawing Sheets

CABLE TETHER SYSTEM

CROSS-REFERENCE TO RELATED APPLICATIONS

The present application is a continuation of U.S. patent application Ser. No. 13/762,062, filed Feb. 7, 2013, titled CABLE TETHER SYSTEM, which claims priority benefit to U.S. Prov. App. No. 61/596,555, filed Feb. 8, 2012, entitled CABLE TETHER SYSTEM, each of which is hereby incorporated herein by reference in its entirety.

BACKGROUND

Cables have become ubiquitous as electronic devices are used throughout commercial and non-commercial areas. The cables associated with these electronic devices are used to transmit data and/or electricity to and from the electronic device. In some fields, such as medical devices, cables are specifically configured to be used with particular medical devices and can be expensive.

In many instances, a cable from one electronic device is connected to a cable from another electronic device. For instance, disposable pulse oximeter sensors are often attached to a cable, which in turn is attached to another cable from the pulse oximeter. When the disposable pulse oximeter sensors are discarded, the removable cables are often unnecessarily discarded as well. This can increase costs as the cables are later replaced.

DETAILED DESCRIPTION

Figure 1A:
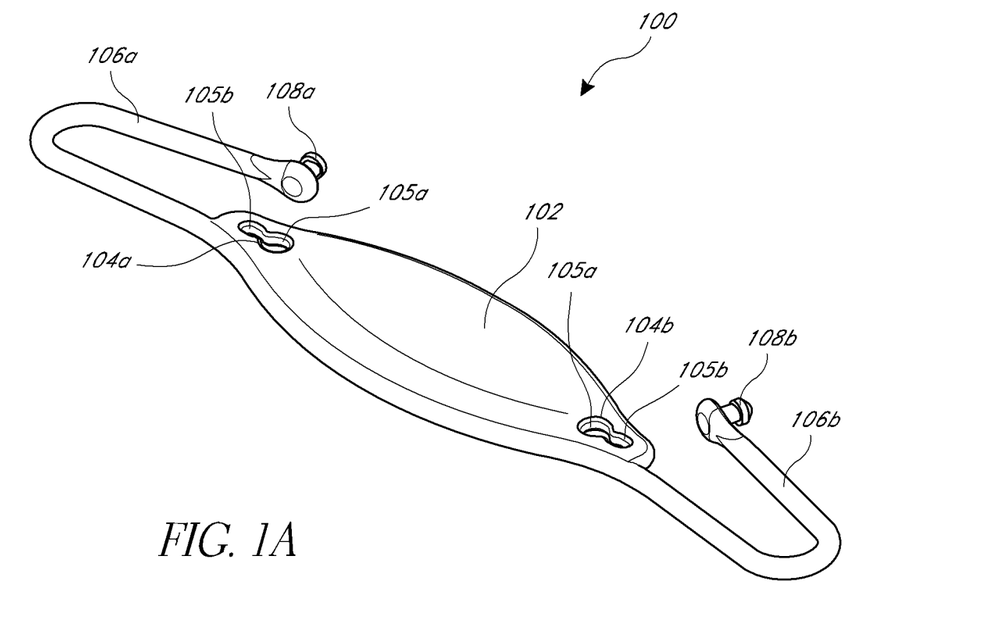
FIGS. 1A-B are perspective views of an embodiment of a cable tether system.
Figure 1B:
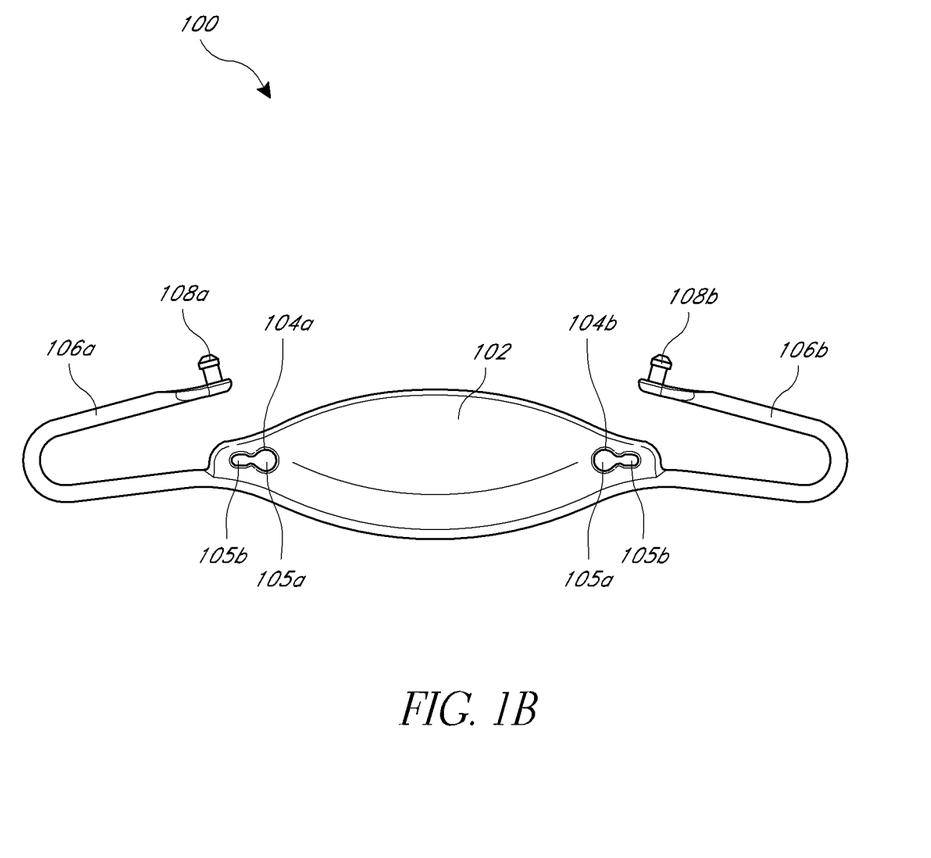

FIGS. 1A and 1B are perspective views of an embodiment of a cable tether system 100. The cable tether system 100 of the illustrated embodiment includes a base member 102 with engagement portions 104A, 104B, and elongate members 106A, 106B, each with an engagement portion 108A, 108B, respectively. The cable tether system 100 can be formed as a single molded piece or multiple individual pieces.

The base member 102 can be made of one or more pieces of plastic, such as elastomeric vinyl, or similar material, and can be made in a variety of shapes including, but not limited to oval, circle, triangle, quadrilateral, pentagon, hexagon, or other shape, as desired. In embodiments where the base member 102 is made of multiple pieces, the pieces can be laminated together or affixed to each other in some other way. Furthermore, the base member 102 can be as rigid or as flexible as desired. In some embodiments, the base member 102 is large enough to cover at least one side of the cable connectors when two cables are connected. In certain embodiments, the base member 102 is large enough to wrap around the cable connectors when the cables are connected. The base member 102 can provide a surface where additional information can be provided. For example, information regarding the cables' specifications, age, and their use can be provided on the base member 102. Additional information can be provided on the base member 102 in the form of words and/or images that the cables are not to be discarded, instructions for use, etc. The base member 102 can also be used to cover the ends of the cables to prevent wear.

The elongate members 106A, 106B can be located on opposite ends of the base member, as illustrated in FIG. 1A, or be on the same end or side. The elongate members 106A, 106B can be made from the same or different material as the base member 102. The elongate members 106A, 106B can be formed so as to be naturally rounded or naturally straight pieces that can be bent. In some embodiments, the elongate members 106A, 106B are less rigid and more flexible than the base member 102. Each elongate member 106A, 106B wraps around a different cable as will be described in greater detail below with reference to FIGS. 2A-2C. In some embodiments, the elongate members 106A, 106B can be shortened, tightened, or twisted, as desired, to more firmly secure the cables to the cable tether system 100.

In the illustrated embodiment, the base member 102 includes engagement portions 104A, 104B. Each engagement portion 104A, 104B includes a first cavity 105A for inserting the engagement portions 108A, 108B and a second cavity 105B for securing the engagement portions 108A, 108B. In some embodiments, the first cavity 105A is larger than the second cavity 105B. In certain embodiments the first cavity 105A is smaller than the second cavity 105B or is the same size.

Figure 1C:
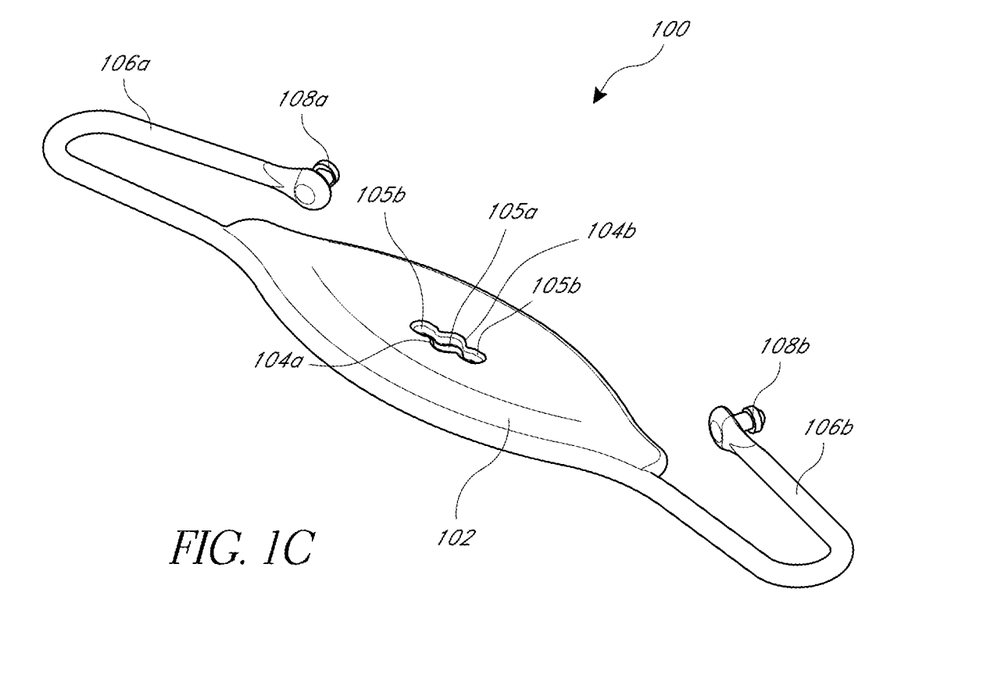
FIG. 1C is a perspective view of an embodiment of a cable tether system.

In the illustrated embodiment of FIG. 1B, the engagement portions 104A, 104B are located at approximately opposite ends of the base member 102, however, the engagement portions 104A, 104B can be located elsewhere on the base member 102. For example, the engagement portions 104A, 104B can be located in the center or on the same end or side of the base member 102. In some embodiments, the engagement portions 104A, 104B include only one cavity each. In certain embodiments, the engagement portions 104A, 104B can be merged into a single engagement portion, as illustrated, for example, in FIG. 1C. In such embodiments, the single engagement portion can include a larger cavity to insert the engagement portions 108A, 108B and two smaller cavities on either side of the larger cavity to secure the engagement portions 108A, 108B. Alternatively, the engagement portions 104A, 104B can be located in the center as two protrusions that interact with the engagement portions 108A, 108B.

At the distal end of each elongate member 106A, 106B is located an engagement portion 108A, 108B, respectively. In some embodiments, the engagement portions 108A, 108B include a protrusion that interacts with cavities of the engagement portions 104A, 104B and can be used to secure the distal end of the of the elongate members 106A, 106B to the base member 102.

In the illustrated embodiment, each engagement portion 104A, 104B includes cavities 105A, 105B and the engagement portions 108A, 108B include protrusions, however, in some embodiments, the engagement portions 104A, 104B can include protrusions and the engagement portions 108A, 108B can include one or more cavities. Other configurations and materials can be used to form the engagement portions 104A, 104B, 108A, 108B, such as hook and loop fasteners, clamps, clasps, pins, buckles, hooks, screws, tape, string, wire, etc.

Figure 2A:
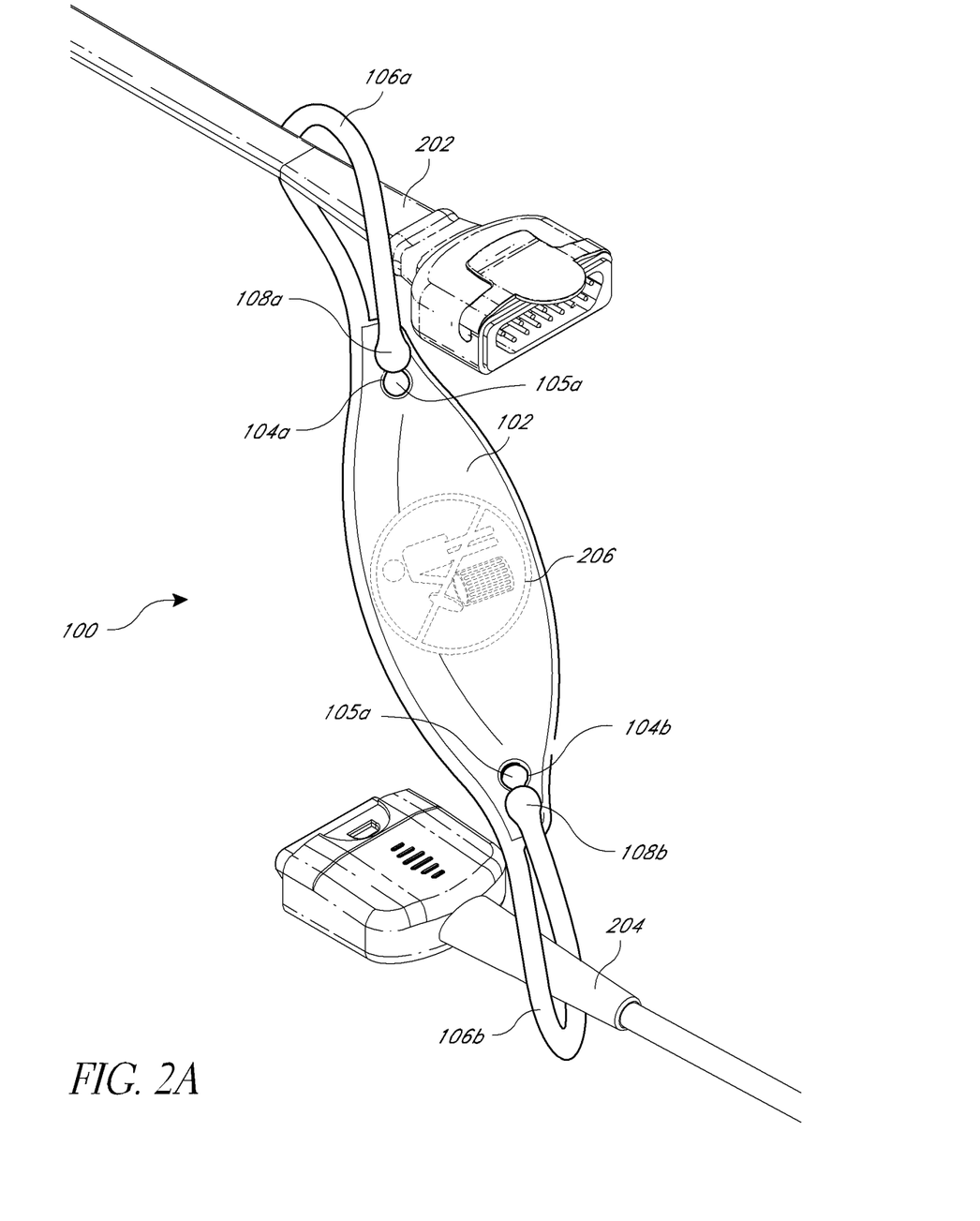
FIGS. 2A-2C are perspective views of an embodiment of a cable tether system connected to two cables.
Figure 2B:
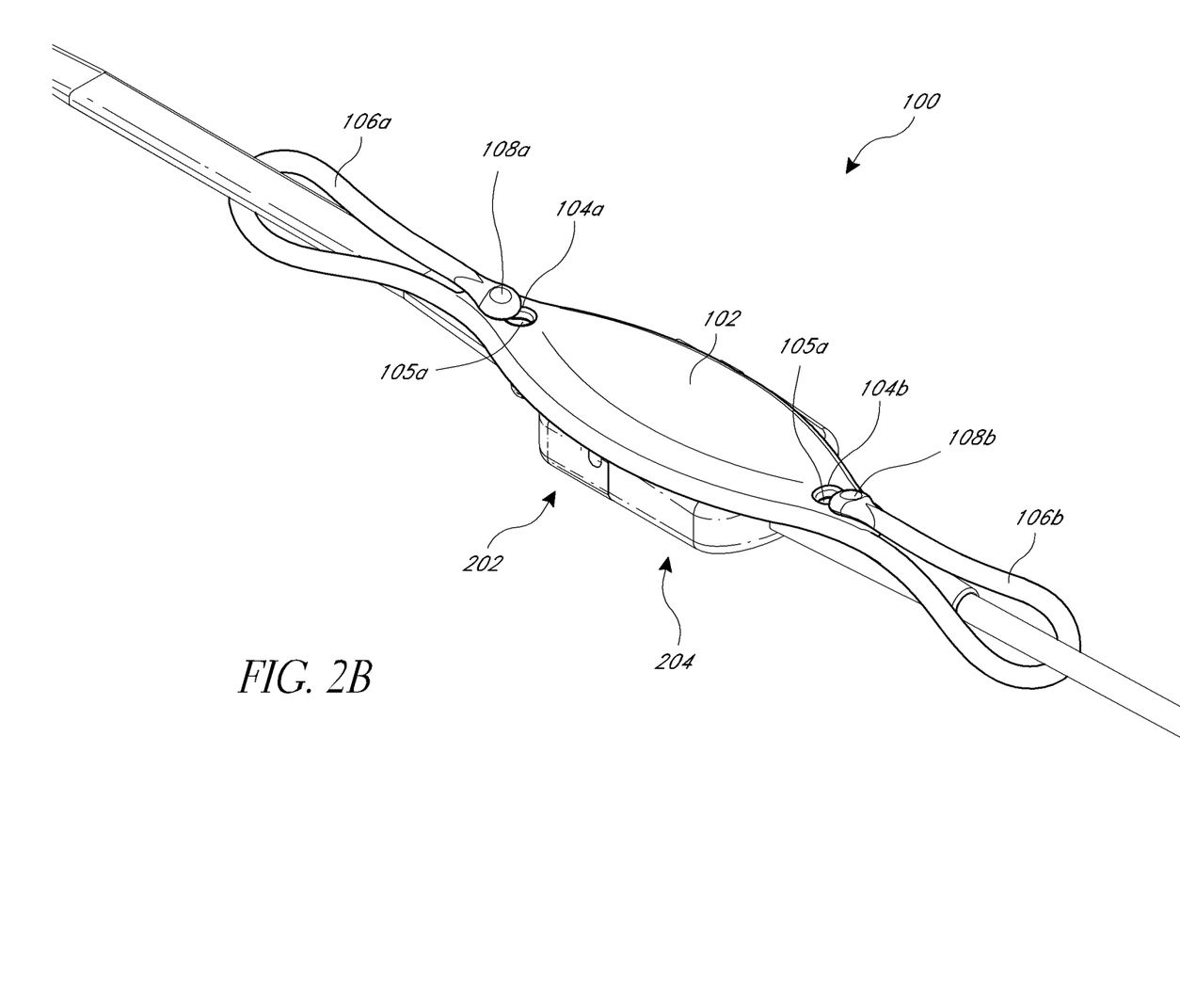
Figure 2C:
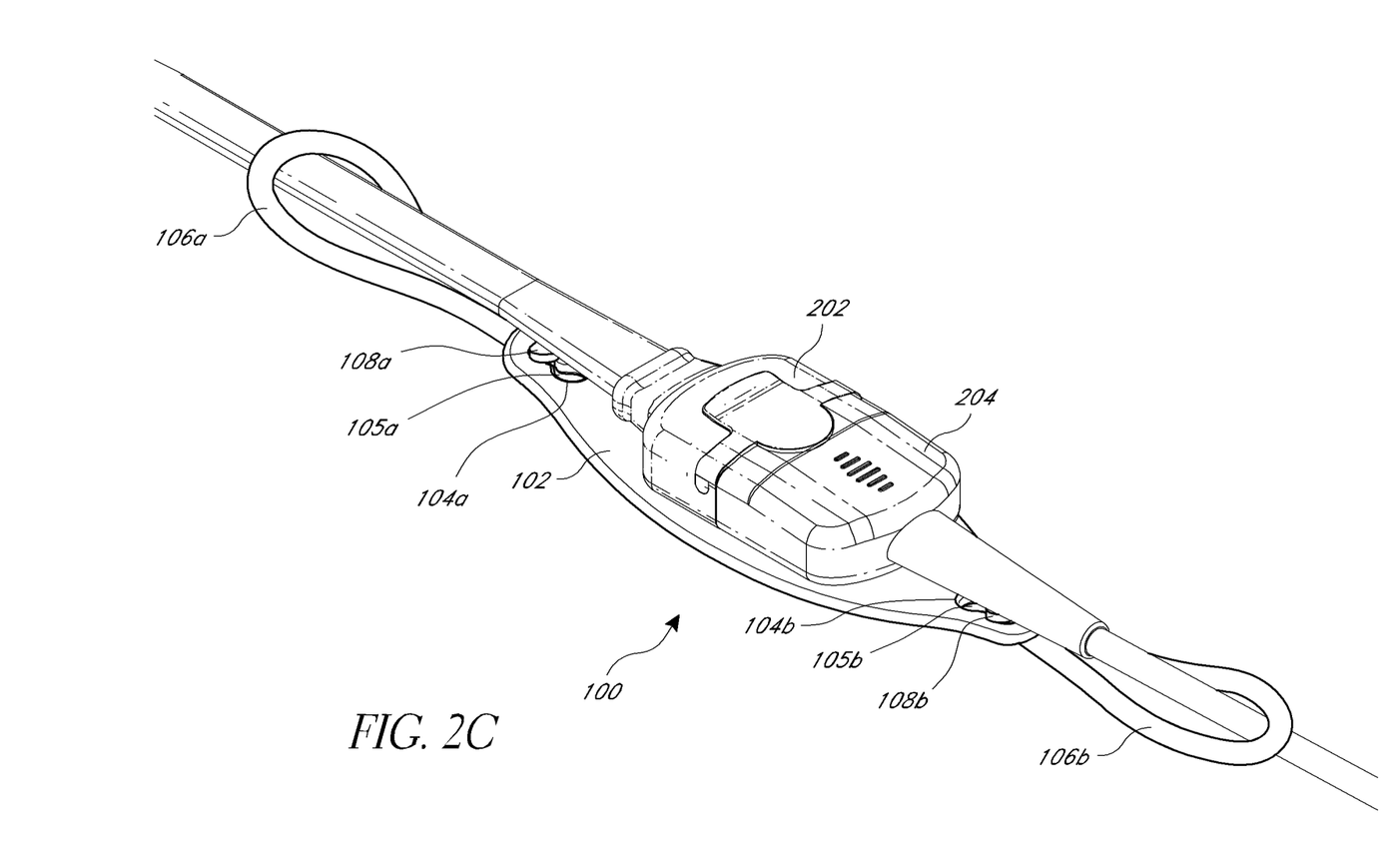

FIGS. 2A-2C are perspective views of an embodiment of the cable tether system 100 engaged with two cables 202, 204. As illustrated, the elongate members 106A, 106B wrap around the cables 202, 204, respectively, and the engagement portions 108A, 108B are secured, or locked, into position within the second cavity 105B (not seen) of the engagement portions 104A, 104B, thereby securing the cables 202, 204 to the cable tether system 100. In addition, the cable tether system 100 includes an image 206 printed on the base member 102 indicating that the cables are not to be discarded or removed. The image 206 can be pad printed with durable sublimating high contrast ink to increase its durability.

FIG. 2B is a top perspective view and FIG. 2C is a bottom perspective view of the cable tether system 100 engaged with the cables 202, 204 when the cables 202, 204 are connected. As illustrated, the elongate members 106A, 106B wrap around the cables 202, 204, respectively, and the engagement portions 108A, 108B are secured to the engagement portions 104A, 104B of the base member 102. In this way, the cables 202, 204 are secured to the cable tether system 100. In addition, in some embodiments, the base member 102 substantially covers at least one side of the cable connectors.

Figure 3:
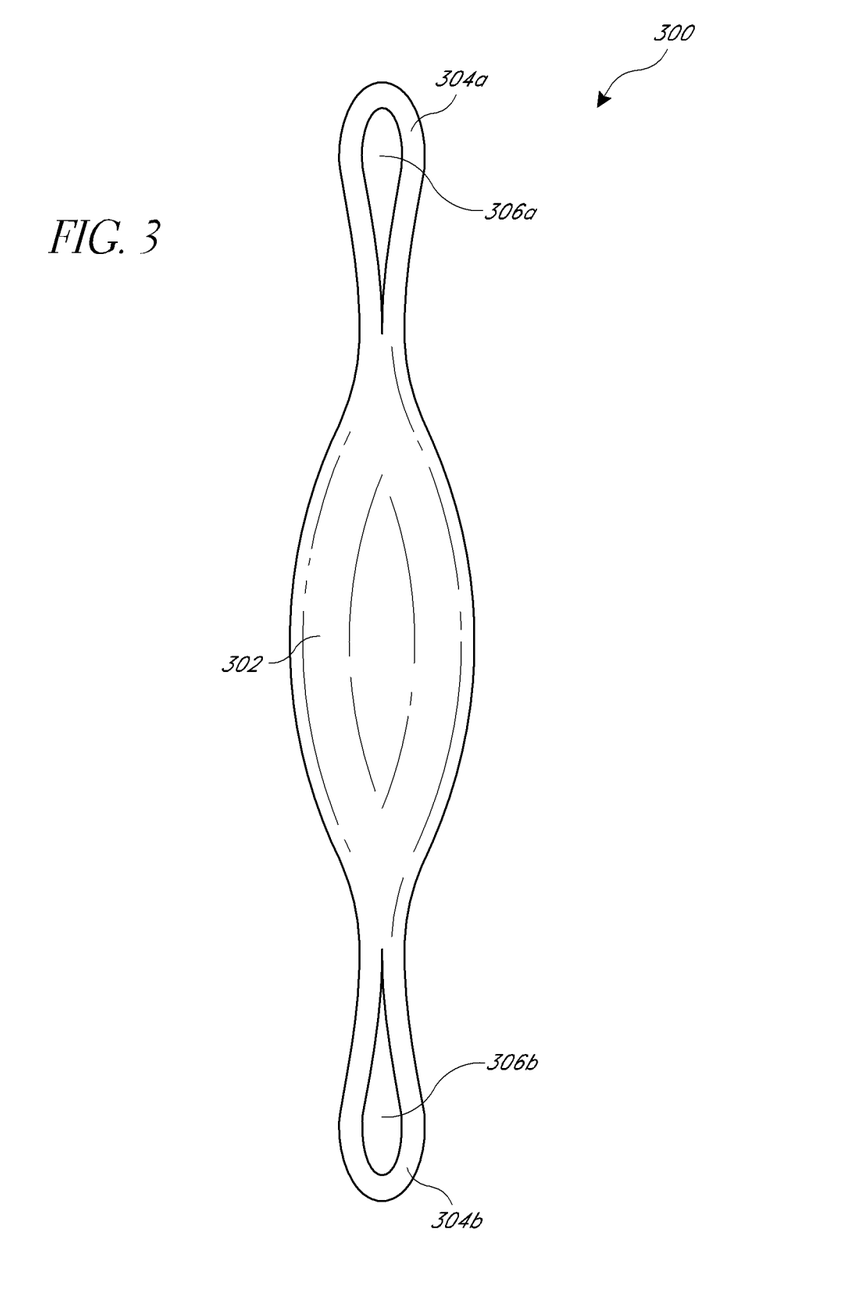
FIGS. 3, 4A, 4B, 5, 6A, 6B, and 7 are perspective views of different embodiments of a cable tether system.

FIGS. 3, 4A, 4B, 5, 6A, 6B, and 7 are perspective views of various embodiments of a cable tether system. FIG. 3 is a perspective view of a cable tether system 300 that includes a base member 302, elongate members 304A, 304B, and cavities 306A, 306B. The base member 302 and elongate members 304A, 304B can be made of plastic, similar to the base member 102 and elongate members 106A, 106B of FIGS. 1A and 1B. In some embodiments, the cable tether system 300 does not include engagement portions.

In the illustrated embodiment, the elongate members 304A, 304B extend outward from the base member 302 in substantially opposite directions from one another, however, the elongate members can be positioned in a variety of different locations and can be located on the same side or end of the base member 302. In some embodiments, both ends of the elongate members 304A, 304B are affixed to the base member 302. In some embodiments, the elongate members 304A, 304B can be shortened, tightened, loosened, stretched, or lengthened, to alter the size of the cavities 306A, 306B.

To secure the cable tether system 300 to cables, the connector portions of the cables can be threaded through the cavities 306A, 306B, respectively. The cavities 306A, 306B can be sized so that the connectors cannot be easily removed once inserted. For example, the cavities 306A, 306B can be sized so that the connectors can more easily pass through the cavities 306A, 306B when the connector is in a first orientation with respect to the cavities 306A, 306B. Once threaded through the connectors can be moved into a second orientation that makes them more difficult to remove. The orientations can include, but are not limited to, vertical, horizontal, a combination thereof, and the like. As mentioned, in some embodiments, the elongate members 304A, 304B can be tightened, shortened, or twisted to reduce the size of the cavities 306A, 306B and to make it more difficult for the cable connectors to be pulled out. In certain embodiments, the elongate members 304A, 304B are stretched to allow the cable connectors to pass through the cavities 306A, 306B. Once the cable connectors have passed through the cavities 306A, 306B, the elongate members 304A, 304B return to their original form, making it less likely that the cable connectors will slip through the cavities 306A, 306B unaided.

Figure 4A:
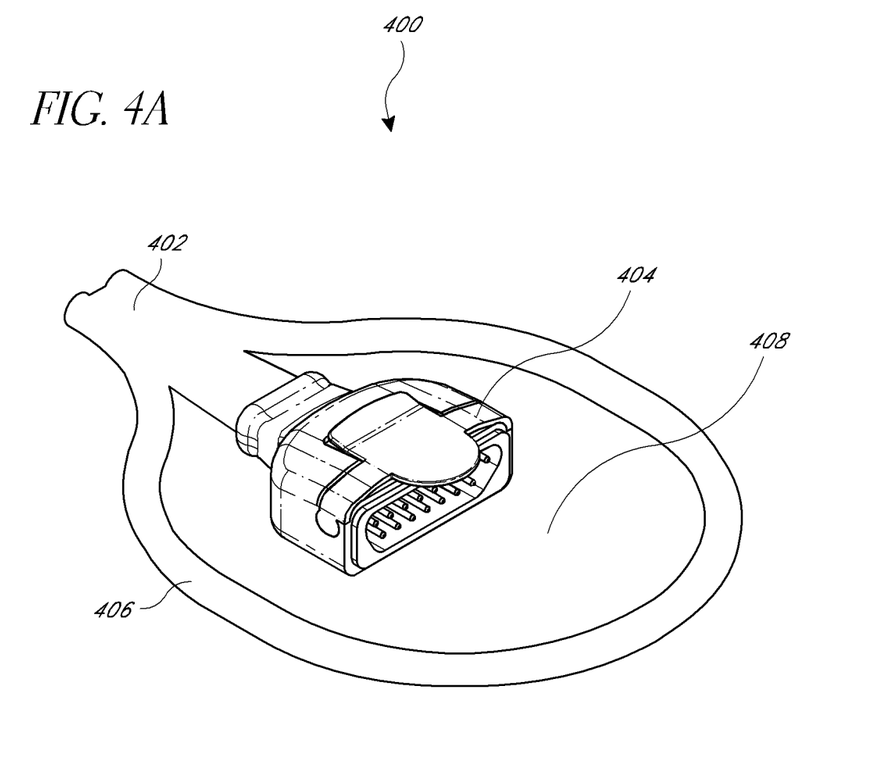

FIG. 4A is a perspective view of a cable tether system 400 that includes a base member 402, a cable connector 404, an elongate member 406, and cavity 408 formed around the cable connector 404. In the illustrated embodiment, the base member 402 is a cable or integrated with a cable. The elongate member 406 and cavity 408 can be in a form similar to that of elongate members 304A, 305B and cavities 306A, 306B, respectively, of FIG. 3.

The cable connector of a second cable can be threaded through the cavity 408 and connected with the cable connector 404. In some embodiments, the second cable connector can be easily threaded through the cavity 408 when in a first orientation and not easily removed when in a second orientation. In certain embodiments, the elongate member 406 is stretched to allow the second cable connector to pass through. In some embodiments, the elongate member 406 can be shortened, tightened, or twisted to reduce the size of the cavity 408 and to make it more difficult for the connector on the second cable to be removed. In certain embodiments, the second cable can include a fastener, such as a clamp, clasp, pin, hook, buckle, etc. to further secure the cables together.

Figure 4B:
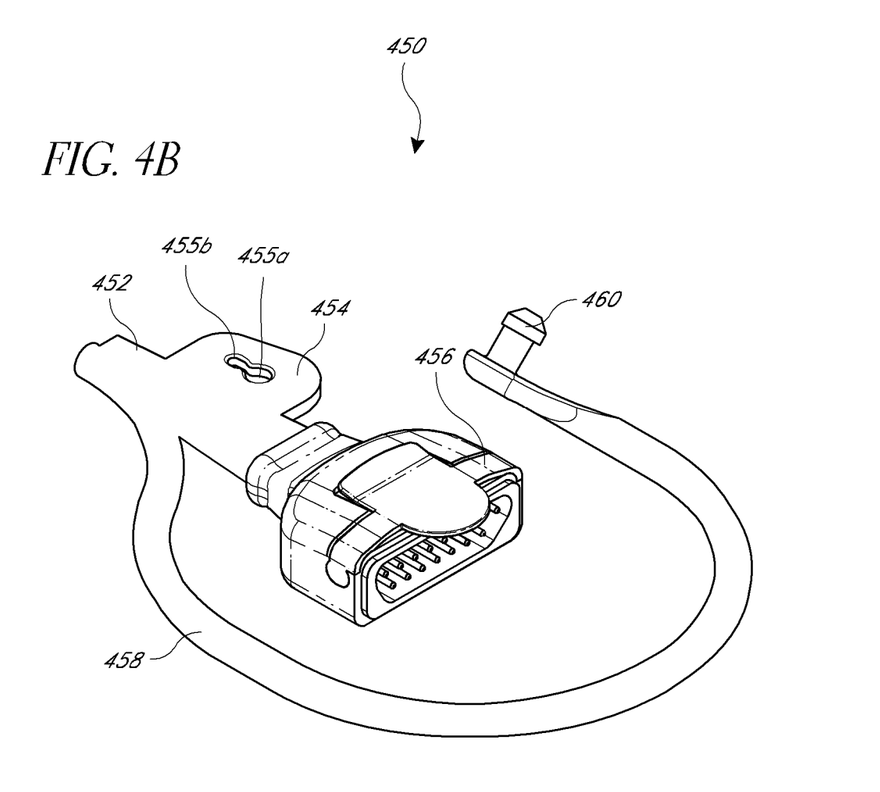

FIG. 4B is a perspective view of another embodiment of a cable tether system 450. In the illustrated embodiment, the cable tether system 450 includes a base member 452, an engagement portion 454 with two cavities 455A, 455B, a cable connector 456, and an elongate member 458 with an engagement portion 460. In the illustrated embodiment, the base member 402 is a cable or integrated with a cable. The engagement portions 454, 460 and elongate member 458 are similar to the engagement portions and elongate members discussed previously with reference to FIGS. 1A and 1B.

During use, the elongate member 458 wraps around a second cable and the engagement portions 454, 460 secure the distal end of the elongate member 458 to the base member 452, thereby securing the base member 452 to the second cable. In the illustrated embodiment, the engagement portion 460 is inserted into the first cavity 455A and moved into a secured position within the second cavity 455B. Many alternatives exist for the engagement portions 454, 460, as described in greater detail above with reference to FIGS. 1A and 1B.

Figure 5:
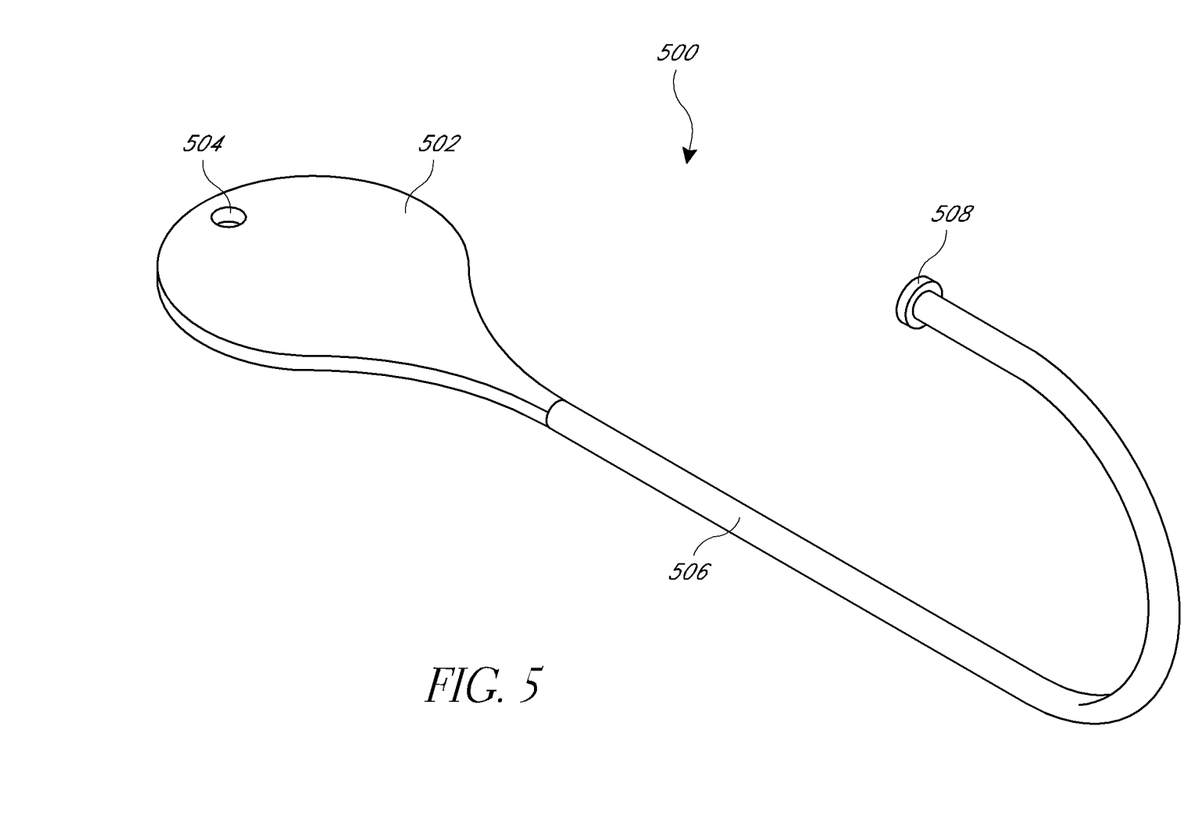

FIG. 5 is a perspective view of a cable tether system 500 that includes a base member 502, elongate member 506 and engagement portions 504, 508. The base member 502 and elongate member 506 can be formed in a manner similar to that described above with reference to FIGS. 1A and 1B. In the illustrated embodiment, the engagement portion 504 includes a cavity and the engagement portion 508 includes a protrusion, however, other configurations can be used as described above with reference to FIGS. 1A and 1B. During use, the elongate member 506 is wrapped around two cables and the engagement portion 508 is secured within the engagement portion 504, thereby securing the two cables to the cable tether system 500.

Figure 6A:
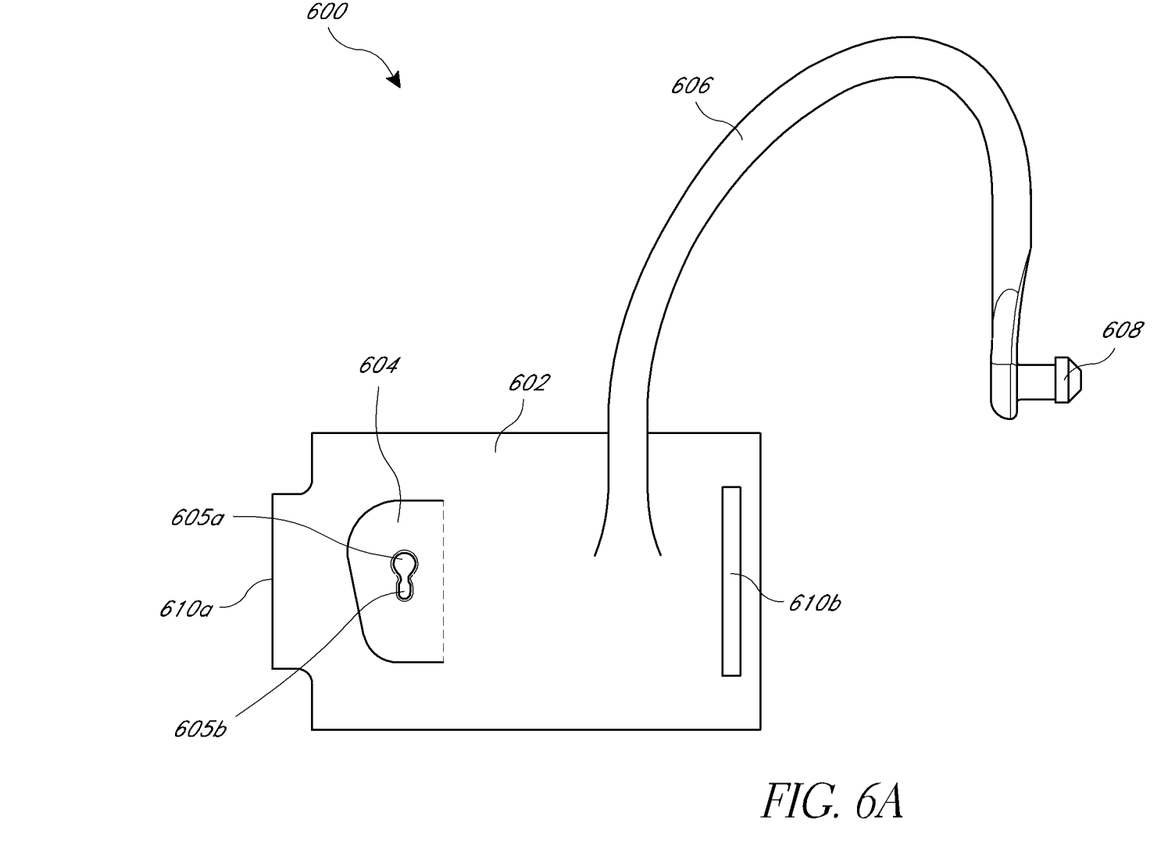
Figure 6B:
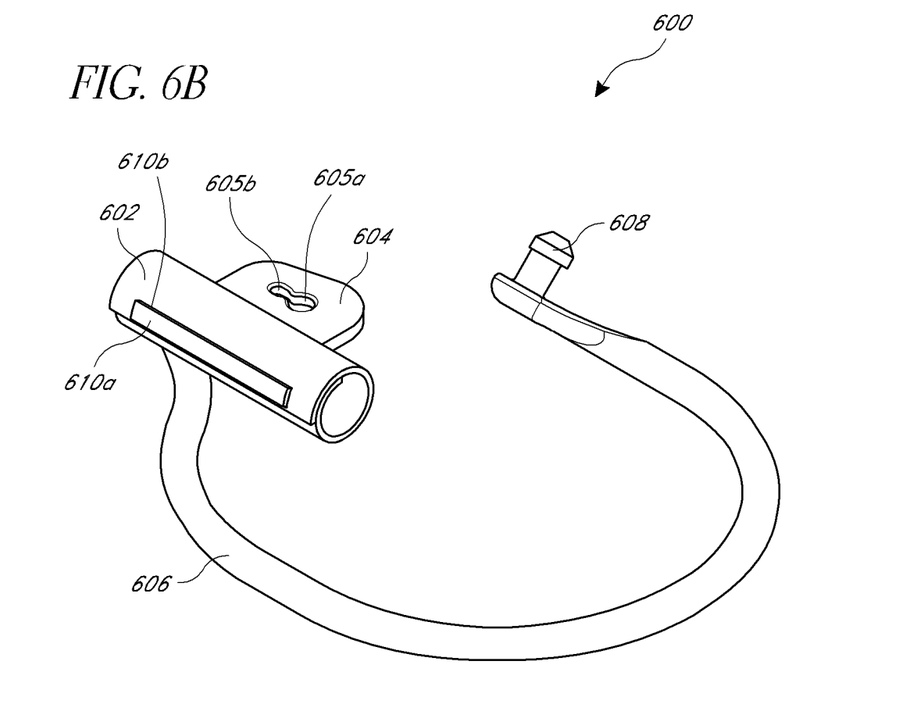

FIGS. 6A and 6B are perspective views of a cable tether system 600 in an open and closed state, respectively. The cable tether system 600 includes a base member 602, a first engagement portion 604 with two cavities 605A, 605B, an elongate member 606, a second engagement portion 608 with a protrusion, and third and fourth engagement portions 610A, 610B.

The base member 602 can be made of a plastic or other flexible material, as discussed previously with reference to FIGS. 1A and 1B. The base member 602 can be wrapped around a portion of a cable (not shown) near the cable connector (not shown). In some embodiments, the base member 602 encircles at least a portion of the cable. When wrapped around the cable, the engagement portions 610A, 610B couple to secure the cable tether system 600 to the cable (not shown), as illustrated in FIG. 6B. The engagement portions 610A, 610B can be formed as a protrusion and cavity, or other configuration as described above with reference to FIGS. 1A and 1B.

Similar to the cable tether systems discussed previously and with reference to FIGS. 1A, 1B, and 8, the elongate member 606 can wrap around a second cable. The protrusion of the engagement portion 608 can be inserted into the cavity 605A of the engagement portion 604 and moved into the cavity 605B to secure the distal end of the engagement portion 608 to the base member 602. In this way, the two cables can be secured to the cable tether system 600. It is to be understood that various configurations can be used to implement the engagement portions 604, 608, as described above with reference to FIGS. 1A and 1B.

Figure 7:
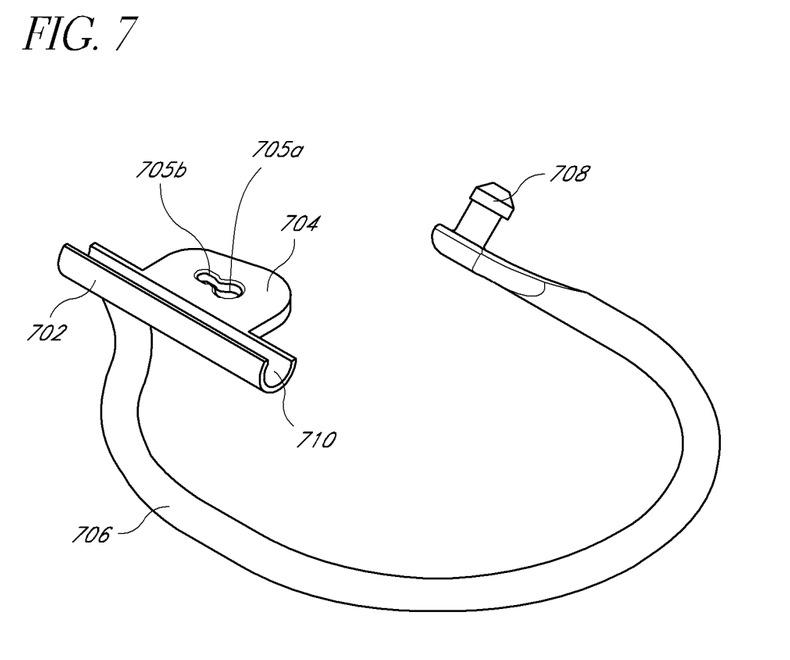

FIG. 7 is a perspective views of a cable tether system 700 that can be fitted to a cable (not shown). The cable tether system 700 includes a base member 702, a first engagement portion 704 with two cavities 705A, 705B, an elongate member 706, and a second engagement portion 708 with a protrusion.

The base member 702 can be made of a plastic or other relatively rigid material that can substantially maintain its shape. The base member 702 is formed to include a hollowed portion 710 and to fit snugly against a cable (not shown). In some embodiments, the base member 702 is snapped onto a cable (not shown) near the cable connector (not shown) and partially encloses a portion of the first cable. In some embodiments, the base member 702 forms a sleeve that encircles at least a portion of the first cable. In certain embodiments, the base member 702 does not encircle a portion of the first cable. Similar to the cable tether systems discussed previously, the elongate member 706 can wrap around a second cable. The protrusion of the engagement portion 708 can be inserted into the cavity 705A of the engagement portion 704 and moved into the cavity 705B to secure the distal end of the engagement portion 708 to the base member 702. In this way, the two cables can be connected to the cable tether system 700. It is to be understood that various configurations can be used to implement the engagement portions 704, 808, as described above with reference to FIGS. 1A and 1B.

Reference throughout this specification to "some embodiments," "certain embodiments," or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics may be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the features illustrated may be made without departing from the spirit of the disclosure. As will be recognized, certain embodiments of the inventions described herein may be embodied within a form that does not provide all of the features and benefits set forth herein, as some features may be used or practiced separately from others.

What is claimed is:

1. A cable tether system, comprising:
    a base member including:
        a first engagement portion; and
        a second engagement portion;
    a first elongate member extending away from the base member configured to enclose at least a portion of a first cable, the first elongate member including a third engagement portion configured to detachably couple with the first engagement portion, wherein the third engagement portion comprises a first protrusion, wherein the first protrusion includes a first head portion coupled to a body of the first elongate member via a first neck portion, wherein the first head portion has a larger perimeter than the first neck portion, and wherein the first head portion and the first neck portion extend perpendicular to the body of the first elongate member; and
    a second elongate member extending away from the base member in a longitudinal direction of the base member and in a substantially opposite direction as the first elongate member and configured to enclose at least a portion of a second cable, the second elongate member including a fourth engagement portion configured to detachably couple with the second engagement portion,
    wherein a width of the base member is greater than a width of a connector of the first cable and a connector of the second cable,
    wherein the base member is composed of a first material, wherein the first elongate member and the second elongate member are composed of a second material that is different from and more flexible than the first material.

2. The cable tether system of claim 1, wherein each of the first and second engagement portions comprise a cavity.

3. The cable tether system of claim 2, wherein the cavity comprises a first cavity and a second cavity, wherein the first cavity is larger than the second cavity.

4. The cable tether system of claim 3, wherein the first cavity is proximally located to a center portion of the base member with respect to the second cavity.

5. The cable tether system of claim 1, wherein the third engagement portion extends into the first engagement portion and the fourth engagement portion extends into the second engagement portion.

6. The cable tether system of claim 1, wherein the base member is configured to cover at least a portion of at least one side of the connector of the first cable and at least portion of at least one side of the connector of the second cable when the connector of the first cable is connected to the connector of the second cable.

7. The cable tether system of claim 1, wherein the first elongate member forms a first cavity to enclose at least a portion of the first cable when the third engagement portion is detachably coupled with the first engagement portion and the second elongate member forms a second cavity to enclose at least a portion of the second cable when the fourth engagement portion is detachably coupled with the second engagement portion, and wherein the first and second elongate members can be tightened, shortened, or twisted to reduce a size of the first and second cavities.

8. The cable tether system of claim 1, wherein the first protrusion is located at a distal end of the first elongate member.

9. The cable tether system of claim 1, wherein the fourth engagement portion comprises a second protrusion located at a distal end of the fourth engagement portion, wherein the second protrusion includes a second head portion coupled to a body of the second elongate member via a second neck portion, wherein the second head portion has a larger perimeter than the second neck portion, and wherein the second head portion and the second neck portion extend perpendicular to the body of the second elongate member.

10. The cable tether system of claim 1, wherein the first engagement portion comprises a first cavity, and wherein the second engagement portion comprises the first cavity.

11. The cable tether system of claim 10, wherein the third engagement portion is configured to extend into the first cavity and the fourth engagement portion is configured to extend into the first cavity.

12. The cable tether system of claim 10, wherein the first engagement portion further comprises a second cavity at least partially overlapping with the first cavity, wherein the second engagement portion further comprises a third cavity at least partially overlapping with the first cavity, wherein the second cavity and third cavity are smaller than the first cavity, wherein the second cavity and third cavity are located on either side of the first cavity.

13. The cable tether system of claim 10, wherein the first engagement portion and the second engagement portion are centrally located on the base member.

14. The cable tether system of claim 10, further comprising:
a first cable connector extending from the base member, and
a second cable connector extending from the base member,
wherein the base member further comprises a cable that electrically connects the first cable connector and the second cable connector.

15. The cable tether system of claim 1, wherein the base member further comprises a printed image located between the first engagement portion and the second engagement portion, the printed image indicating that a cable is not to be discarded.

16. The cable tether system of claim 15, wherein the printed image comprises sublimating high contrast ink.

17. The cable tether system of claim 15, wherein the printed image, the first engagement portion, and the second engagement portion are located on a first side of the base member.

18. A cable tether system, comprising:
a base member including:
a first engagement portion; and
a second engagement portion;
a first elongate member extending away from the base member configured to enclose at least a portion of a first cable, the first elongate member including a third engagement portion configured to detachably couple with the first engagement portion, wherein the third engagement portion comprises a first protrusion, wherein the first protrusion includes a first head portion coupled to a body of the first elongate member via a first neck portion, wherein the first head portion has a larger perimeter than the first neck portion, and wherein the first head portion and the first neck portion extend perpendicular to the body of the first elongate member; and
a second elongate member extending away from the base member in a longitudinal direction of the base member and in a substantially opposite direction as the first elongate member and configured to enclose at least a portion of a second cable, the second elongate member including a fourth engagement portion configured to detachably couple with the second engagement portion,
wherein a width of the base member is greater than a width of a connector of the first cable and a connector of the second cable,
wherein the first elongate member and the second elongate member are composed of a first material, wherein the base member is composed of a second material that is different from and more rigid than the first material.

19. The cable tether system of claim 18, wherein each of the first and second engagement portions comprise a cavity.

20. The cable tether system of claim 19, wherein the cavity comprises a first cavity and a second cavity, wherein the first cavity is larger than the second cavity.

21. The cable tether system of claim 20, wherein the first cavity is proximally located to a center portion of the base member with respect to the second cavity.

22. The cable tether system of claim 18, wherein the third engagement portion extends into the first engagement portion and the fourth engagement portion extends into the second engagement portion.

23. The cable tether system of claim 18, wherein the base member is configured to cover at least a portion of at least one side of the connector of the first cable and at least portion of at least one side of the connector of the second cable when the connector of the first cable is connected to the connector of the second cable.

24. The cable tether system of claim 18, wherein the first elongate member forms a first cavity to enclose at least a portion of the first cable when the third engagement portion is detachably coupled with the first engagement portion and the second elongate member forms a second cavity to enclose at least a portion of the second cable when the fourth engagement portion is detachably coupled with the second engagement portion, and wherein the first and second elongate members can be tightened, shortened, or twisted to reduce a size of the first and second cavities.

25. The cable tether system of claim 18, wherein the first protrusion is located at a distal end of the first elongate member.

26. The cable tether system of claim 18, wherein the fourth engagement portion comprises a second protrusion located at a distal end of the fourth engagement portion, wherein the second protrusion includes a second head portion coupled to a body of the second elongate member via a second neck portion, wherein the second head portion has a larger perimeter than the second neck portion, and wherein the second head portion and the second neck portion extend perpendicular to the body of the second elongate member.

27. The cable tether system of claim 18, wherein the first engagement portion comprises a first cavity, and wherein the second engagement portion comprises the first cavity.

28. The cable tether system of claim 27, wherein the printed image comprises sublimating high contrast ink.

29. The cable tether system of claim 27, wherein the printed image, the first engagement portion, and the second engagement portion are located on a first side of the base member.

30. The cable tether system of claim 27, wherein the third engagement portion is configured to extend into the first cavity and the fourth engagement portion is configured to extend into the first cavity.

31. The cable tether system of claim 27, wherein the first engagement portion further comprises a second cavity at least partially overlapping with the first cavity, wherein the second engagement portion further comprises a third cavity at least partially overlapping with the first cavity, wherein the second cavity and third cavity are smaller than the first cavity, wherein the second cavity and third cavity are located on either side of the first cavity.

32. The cable tether system of claim 27, wherein the first engagement portion and the second engagement portion are centrally located on the base member.

33. The cable tether system of claim 27, further comprising:
a first cable connector extending from the base member, and
a second cable connector extending from the base member,
wherein the base member further comprises a cable that electrically connects the first cable connector and the second cable connector.

34. The cable tether system of claim 18, wherein the base member further comprises a printed image located between the first engagement portion and the second engagement portion, the printed image indicating that a cable is not to be discarded.

35. A cable tether system, comprising:
a base member including:
a first engagement portion; and
a second engagement portion;
a first elongate member extending away from the base member configured to enclose at least a portion of a first cable, the first elongate member including a third engagement portion configured to detachably couple with the first engagement portion, wherein the third engagement portion comprises a first protrusion, wherein the first protrusion includes a first head portion coupled to a body of the first elongate member via a first neck portion, wherein the first head portion has a larger perimeter than the first neck portion, and wherein the first head portion and the first neck portion extend perpendicular to the body of the first elongate member; and
a second elongate member extending away from the base member in a longitudinal direction of the base member and in a substantially opposite direction as the first elongate member and configured to enclose at least a portion of a second cable, the second elongate member including a fourth engagement portion configured to detachably couple with the second engagement portion,
wherein a width of the base member is greater than a width of a connector of the first cable and a connector of the second cable,
wherein the first engagement portion comprises a first cavity, wherein the second engagement portion comprises the first cavity, and wherein the first engagement portion and the second engagement portion are centrally located on the base member.

* * * * *